US010738911B2

(12) United States Patent
Terwart et al.

(10) Patent No.: US 10,738,911 B2
(45) Date of Patent: Aug. 11, 2020

(54) METHOD FOR ACTUATING A VALVE DEVICE ON THE BASIS OF A CHARACTERISTIC CURVE

(71) Applicant: ZF Friedrichshafen AG, Friedrichshafen (DE)

(72) Inventors: Markus Terwart, Thundorf (DE); Rainer Novak, Bregenz (AT); Dirk Friederich, Daisendorf (DE)

(73) Assignee: ZF FRIEDRICHSHAFEN AG, Friedrichshafen (DE)

( * ) Notice: Subject to any disclaimer, the term of this patent is extended or adjusted under 35 U.S.C. 154(b) by 0 days.

(21) Appl. No.: 16/325,548

(22) PCT Filed: Jul. 10, 2017

(86) PCT No.: PCT/EP2017/067221
§ 371 (c)(1),
(2) Date: Feb. 14, 2019

(87) PCT Pub. No.: WO2018/033302
PCT Pub. Date: Feb. 22, 2018

(65) Prior Publication Data
US 2019/0178416 A1 Jun. 13, 2019

(30) Foreign Application Priority Data
Aug. 16, 2016 (DE) .......... 10 2016 215 229

(51) Int. Cl.
*F16K 37/00* (2006.01)
*G05B 19/416* (2006.01)
(Continued)

(52) U.S. Cl.
CPC ..... *F16K 37/0083* (2013.01); *F16H 57/0435* (2013.01); *F16H 57/0436* (2013.01);
(Continued)

(58) Field of Classification Search
CPC ......... F16H 2061/0037; F16H 57/0412; F16H 57/0435; F16H 57/0436; F16H 61/0251;
(Continued)

(56) References Cited

U.S. PATENT DOCUMENTS

| 5,222,417 A | 6/1993 | Sato |
| 6,023,988 A | 2/2000 | McKee et al. |

(Continued)

FOREIGN PATENT DOCUMENTS

| DE | 19930965 A1 | 1/2001 |
| DE | 102005022063 A1 | 11/2006 |

(Continued)

OTHER PUBLICATIONS

German Search Report DE102016215229.7, dated Jun. 26, 2017. (12 pages).

(Continued)

*Primary Examiner* — Abdelmoniem I Elamin
(74) *Attorney, Agent, or Firm* — Dority & Manning, P.A.

(57) ABSTRACT

A method for actuating a valve device as a function of a characteristic curve including actuating the valve device with a dither superimposed on a target value (i_EDS) with such a frequency that the operating condition of the valve device follows the actuation corresponding to the characteristic curve (v_kk). The method further includes determining, with the characteristic curve (v_kk), the output values ("1", x) which correlate with the target values (i_EDS) at inflection points of a harmonic oscillation impressed upon the valve device with the dither, and determining further output values as a function of the output values ("1", x). The amplitude of the dither is predefined such that, during an actuation of the valve device, one of the inflection points lies in a first or second characteristic curve range (v_kk1 or (Continued)

v_kk3, v_kk3 or v_kk5), and another inflection point lies in a third characteristic curve range (v_kk2 or v_kk4).

7 Claims, 3 Drawing Sheets

(51) Int. Cl.
    *F16H 57/04*     (2010.01)
    *F16H 61/02*     (2006.01)
    *H01F 7/18*     (2006.01)
    *F16H 61/688*     (2006.01)
    *F16H 61/00*     (2006.01)

(52) U.S. Cl.
    CPC ..... *F16H 61/0251* (2013.01); *F16K 37/0075* (2013.01); *G05B 19/416* (2013.01); *H01F 7/1844* (2013.01); *F16H 57/0412* (2013.01); *F16H 61/688* (2013.01); *F16H 2061/0037* (2013.01); *G05B 2219/45006* (2013.01); *H01F 2007/1855* (2013.01)

(58) Field of Classification Search
    CPC ............. F16K 37/0075; F16K 37/0083; G05B 19/416; G05B 2219/45006; H01F 2007/1855; H01F 7/1844
    See application file for complete search history.

(56) References Cited

U.S. PATENT DOCUMENTS

| | | | |
|---|---|---|---|
| 8,051,649 B2 * | 11/2011 | Yoshimoto | E02F 9/226 60/329 |
| 8,165,762 B2 | 4/2012 | Popp et al. | |
| 9,939,081 B2 * | 4/2018 | Yorita | G05D 16/2013 |
| 9,970,535 B1 * | 5/2018 | Fuller | B23P 15/001 |
| 10,139,375 B2 * | 11/2018 | Ge | F16K 11/07 |
| 2004/0003788 A1 * | 1/2004 | Taylor | F01L 1/022 123/90.15 |
| 2006/0011878 A1 * | 1/2006 | Denyer | F16K 31/0613 251/129.08 |
| 2009/0225489 A1 * | 9/2009 | Lehner | F16K 31/0675 361/152 |

FOREIGN PATENT DOCUMENTS

| | | |
|---|---|---|
| DE | 102005024173 A1 | 11/2006 |
| DE | 102006012657 A1 | 9/2007 |
| DE | 102008000304 A1 | 8/2009 |
| DE | 102014207798 A1 | 10/2015 |
| WO | WO 2006/119751 | 11/2006 |

OTHER PUBLICATIONS

International Search Report (English Translation) PCT/EP2017/067221, dated Sep. 26, 2017. (3 pages).

* cited by examiner

METHOD FOR ACTUATING A VALVE DEVICE ON THE BASIS OF A CHARACTERISTIC CURVE

FIELD OF THE INVENTION

The invention relates generally to a method for actuating a valve device as a function of a characteristic curve.

BACKGROUND

Dual clutch transmissions known from practical experience, on which high performance demands are placed, are provided with an appropriately efficient cooling concept. In such transmissions, the cooling, which is necessary depending on the operating condition, of wet-running multi-disk clutches of a dual clutch system as well as of further transmission components, such as an all-wheel clutch, is ensured with the aid of an actuation of a cooling valve of an electro-hydraulic transmission control system according to demand. Such a cooling valve is a pressure control valve in this case when cooling oil is applied via the cooling valve essentially only to the multi-disk clutches of the dual clutch system. As a result, the entire actuating range is largely usable for the regulation, which positively affects the achievable accuracy.

If, in addition to the need for clutch cooling, there are demands for variable gear set cooling as well as cooling which, overall, is utilized according to demand and is optimal in terms of energy consumption, the cooling valve is a pilot-controllable distributor valve, as is known. Such cooling valves, which are also referred to as cooling oil distributor valves, are pilot controlled, for example, with the aid of an electromagnetic pressure regulator or an electromagnetic pilot stage, in the area of which a pilot pressure is set as a function of an actuating current and an applied supply pressure. The pilot pressure, in turn, is applied in order to actuate the cooling valve.

An electro-hydraulic transmission control system comprising such a cooling oil distributor valve is known, for example, from DE 10 2014 207 798 A1.

In principle, the stationary relationship between the input parameter, i.e., the actuating current of the electromagnetic pilot stage, and the associated output parameter, i.e., in this case, the particular distribution factors of the hydraulic fluid applied at the cooling valve in the direction of dual clutch system as well as further areas of the dual clutch transmission, are graphically representable as a so-called cooling oil characteristic curve, wherein the term "distribution factor" is understood to mean the percentage distribution, which is adjustable in the area of the cooling valve with the aid of the pilot control, of the available cooling oil between the component or areas of the dual clutch transmission to be cooled.

In order to be able to operate a dual clutch transmission with the highest possible efficiency, a variable displacement pump is provided for the hydraulic supply, with the aid of which not only the cooling oil valve, but also further hydraulic consumers of the dual clutch transmission, such as clutch actuators, shift actuators of the dual clutch transmission, and the like, are supplied with hydraulic fluid. The volumetric output flow of such a variable displacement pump, which is not required for the supply of primary hydraulic consumers of the dual clutch transmission, is routed in the direction of a cooling and lubricating circuit of a dual clutch transmission and is distributed to the particular transmission components to be cooled and to be lubricated, depending on the thermal demands.

In addition, a so-called system pressure valve is provided for setting a system pressure required for the operation of the consumers. The system pressure valve is also actuated with the aid of an electromagnetic pilot stage.

FIG. 2 shows profiles of various distribution factors of a cooling valve with respect to an actuating current i_EDS of an electro-hydraulic pressure regulator of an electro-hydraulic transmission control system associated with the cooling valve. In the area of the electro-hydraulic pressure regulator, in turn, a pilot pressure is set as a function of the particular actuating current i_EDS. The pilot pressure is applicable at the cooling valve and, depending on which, in turn, a valve slide of the cooling valve is displaceable between a first defined end position and a second defined end position in order to be able to route the hydraulic fluid volume, which is applied at the cooling valve, to the desired extent in the direction of the areas of the transmission which is, for example, a dual clutch transmission.

In this case, the profile v_sa indicates the particular portion of the hydraulic fluid flow applied at the cooling valve, which, at the particular set actuating current value i_EDS, is routed in the direction of a suction loading of a hydraulic pump of the transmission, while the profile v_kk indicates the portion of the hydraulic fluid flow applied at the cooling valve, which, at the currently set current value i_EDS, is routed starting from the cooling valve in the direction of a dual clutch system of the transmission. The further profile v_rs, in turn, indicates the particular portion of the hydraulic fluid flow applied at the cooling valve with respect to the actuating current i_EDS of the electro-hydraulic pressure regulator, which is applied to a particular gear set of the transmission for cooling purposes.

The schematic representation, shown in FIG. 2, of the distribution of the hydraulic fluid volume applied at the cooling valve in the direction of the suction loading of the hydraulic pump, the clutch cooling, and the gear set cooling with respect to the actuating current i_EDS of the electro-hydraulic pressure regulator shows a stationary relationship between the actuating current i_EDS and the particular associated distribution factor of the cooling valve for the available hydraulic fluid volume. In this case, the distribution factors v_sa, v_kk and v_rs correspond to the percentage distribution of the available hydraulic fluid volume between the components or areas of the transmission to which the hydraulic fluid volume is to be applied.

In order to be able to actuate the cooling valve with the demanded accuracy, the stationary dependence is determined on a special component test bench before the transmission is delivered. Therefore, specimen-specific tolerances in the area of the pilot stage or the electro-hydraulic pressure regulator as well as geometric and mechanical tolerances of the electro-hydraulic transmission control system are represented. The data determined on the component test bench are stored in a so-called bin file and are flashed or uploaded into a control unit in the overall vehicle in a manner which is appropriate for the installed transmission.

In a first target value range i_EDSA of the actuating current i_EDS between a current value equal to zero and a first current value i_EDS1, the distribution factor v_rs is essentially equal to zero, while the distribution factors v_sa and v_kk are greater than zero and each have a constant profile. The distribution factor v_kk is less than the distribution factor v_sa within the first target value range i_EDSA. Starting at the current value i_EDS1, the distribution factor v_kk continuously increases, within a second target value range i_EDSB of the actuating current i_EDS, with a high gradient in the direction toward 100%, while the distribution factor $v\_sa$ decreases, within a second target value range $i\_EDSB$ of the actuating current $i\_EDS$, to the same extent in the direction toward zero, and the distribution factor $v\_rs$ is essentially equal to zero within the second target value range $i\_EDSB$. In this case, the distribution factor $v\_kk$ is equal to 1, i.e., 100%, starting at a second current value $i\_EDS2$. As the current value $i\_EDS$ of the electro-hydraulic pressure regulator increases further within a third target value range $i\_EDSC$ of the actuating current $i\_EDS$ between the second current value $i\_EDS2$ and a third current value $i\_EDS3$, the hydraulic fluid volume applied at the cooling valve is essentially conducted completely in the direction of the dual clutch system.

Starting at a third current value $i\_EDS3$, the portion of the hydraulic fluid volume applied at the cooling valve, which is routed in the direction of the dual clutch system, constantly decreases within a fourth target value range $i\_EDSD$ of the actuating current $i\_EDS$, while the distribution factor $v\_rs$ of the cooling valve constantly increases. At a fourth current value $i\_EDS4$, the fourth target value range $i\_EDSD$ ends and the distribution factor $v\_rs$ is equal to 1, while the distribution factor $v\_kk$ has the value zero. As the actuating current $i\_EDS$ increases further, the profile of the distribution factor $v\_rs$ has a constant value equal to one, starting at the fourth current value $i\_EDS4$, within a fifth target value range $i\_EDSE$ of the actuating current $i\_EDS$ adjoining the fourth target value range $i\_EDSD$. In this case, the fourth current value $i\_EDS4$ corresponds to the base point of the cooling oil distribution in the direction of the clutch cooling or the supply of the dual clutch system with hydraulic fluid volumes.

The current values $i\_EDS1$ to $i\_EDS4$ are so-called support points of the characteristic curves of the distribution factors $v\_sa$, $v\_kk$, and $v\_rs$, at each current value $i\_EDS1$, $i\_EDS2$, $i\_EDS3$, $i\_EDS4$ a significant change of the gradient of the profile of the distribution factor $v\_sa$, of the distribution factor $v\_kk$, and of the distribution factor $v\_rs$ takes place.

Therefore, the actuating range of the cooling valve or of the cooling oil distribution valve in the example shown in FIG. 2 is subdivided into five target value ranges $i\_EDSA$ to $i\_EDSE$ of the actuating current $i\_EDS$, i.e., five operating ranges of the cooling valve. The cooling oil which is available in a particular case is simultaneously conducted or distributed via the cooling valve, at most, in the direction of two hydraulic consumers.

In the first operating range of the actuating range of the cooling valve, the profiles $v\_kk$, $v\_sa$, and $v\_rs$ encompass characteristic curve ranges $v\_kk1$, $v\_sa1$, and $v\_rs1$, respectively, i.e., a so-called plateau in each case, wherein the plateau $v\_kk1$ of the profile $v\_kk$ lies at a defined level a of the distribution factor $v\_kk$ between zero and 100%. The plateaus $v\_kk1$ and $v\_sa1$ of the profiles $v\_kk$ and $v\_sa$ are followed by characteristic curve ranges extending across the second target value range $i\_EDSB$, i.e., first transition ranges $v\_kk2$ and $v\_sa2$ of the profiles $v\_kk$ and $v\_sa$, respectively, the gradients of which are correspondingly high. Within the third target value range $i\_EDSC$, i.e., the third operating range of the actuating range of the cooling valve, the profiles $v\_kk$, $v\_sa$, and $v\_rs$ encompass characteristic curve ranges or plateaus $v\_kk3$, $v\_sa3$, and $v\_rs3$, respectively, having a gradient equal to zero.

Within the fourth target value range $i\_EDSD$, i.e., within the fourth operating range of the actuating range of the cooling valve, the profiles $v\_kk$ and $v\_rs$, in turn, encompass characteristic curve ranges or transition ranges $v\_kk4$ and $v\_rs4$, respectively, having high gradients, while the profiles $v\_kk$ and $v\_rs$ within the fifth operating range of the actuating range of the cooling valve following the fourth operating range encompass characteristic curve ranges $v\_kk5$ and $v\_rs5$, respectively, i.e., plateaus having a slope equal to zero.

Both the second as well as the fourth operating ranges $i\_EDSB$ and $i\_EDSD$, respectively, of the actuating range of the cooling valve are relevant for a precise actuation of the cooling valve, which is why they define the respective sections $v\_kk2$ and $v\_kk4$ of the characteristic curve $v\_kk$, i.e., of the cooling characteristic curve, to be considered in greater detail, and only a relatively narrow part of the tolerance-affected actuating range is usable. This, in turn, has a significant influence on the achievable accuracy, because small inaccuracies with respect to the energization of the electro-hydraulic pressure regulator generate high inaccuracies with respect to the cooling valve to be actuated with the aid of the electro-hydraulic pressure regulator, and, therefore, with respect to the particular distribution factors $v\_kk$, $v\_sa$, and $v\_rs$ of the cooling valve representing the output parameter.

This is due to the fact, in the case under consideration, that the accuracy of the distribution factor $v\_kk$, $v\_sa$, or $v\_rs$ to be adjusted depends on the achievable accuracy of the utilized hydraulic pilot stage and the tolerances of the valve switching actuated therewith. The output parameter of the pilot stage, which is a pilot pressure, is strongly dependent on the hysteresis of its electromagnetic circuit in the case of conventional components. Finally, this pilot pressure is converted into a displacement signal of the actuated cooling valve with the aid of the valve switching. With respect to this pressure-displacement conversion, however, particle contamination in the utilized oil medium, as well as static- and kinetic-friction effects between the valve slide and its bore, which are influenced by shape and position tolerances, production inclusions on the particular surfaces, and the like, can cause undesirable errors in the conversion of the displacement signal. These undesirable errors are significant, in particular, in the case of valve switchings controlled purely by an open-loop system, i.e., without an internal coupling. Such switchings have the advantage that they are operable at lower pressure levels, whereby better hydraulic efficiencies are achieved.

Presently, effects resulting from the electromagnetic hysteresis in the area of electro-hydraulic pilot stages and from the static friction of the subsequent slide of the cooling valve are largely eliminated by a relatively low rate of a chopper frequency of 1 kHz of the current control as well as an actively superimposed dither having a frequency of approximately 125 Hz, which the actuated subsequent slide cannot dynamically follow, however. The underlying basic idea in this case is that of triggering micro-movements in the area of the pilot stage which therefore no longer switches into the static friction condition, while the electromagnetic hysteresis is simultaneously reduced.

If an accuracy or a reproducibility of the actuation of a cooling valve or, in general, of a valve cannot be ensured to the desired extent, a wide range of problems may occur during operation. The problems range from reduced comfort, as perceived by the driver, and so-called gear blockers, to burnt clutches or damage to bearings and gearwheels, all of which are caused by insufficient cooling and result in transmission failures and complaints.

The problem addressed by the present invention is therefore that of providing a method for actuating a valve device as a function of a characteristic curve, in order to be able to operate a valve device with a desirably high level of accuracy.

SUMMARY OF THE INVENTION

A method according to the invention includes actuating a valve device as a function of a characteristic curve, via which a target value corresponding to an actuating parameter of the valve device is determined. The target value correlates with an output value corresponding to a demanded operating condition of the valve device. The characteristic curve encompasses at least a first characteristic curve range, a second characteristic curve range, and a third characteristic curve range, where a gradient of the third characteristic curve range arranged between the first characteristic curve range and the second characteristic curve range is greater than gradients of the first characteristic curve range and of the second characteristic curve range. The valve device is actuated with a dither superimposed on the target value.

In this case, the frequency is provided in such a way that the operating condition of the valve device follows, in a defined way, the actuation in accordance with the characteristic curve and, with the aid of the characteristic curve, the output values are determined, which correlate with the target values which are present at the inflection points of the harmonic oscillation impressed upon the valve device with the aid of the dither. On the basis of the output values, further output values are determined, as a function of which the actuation of the valve device is carried out.

The amplitude of the dither is predefined in such a way that, during the actuation of the valve device, one of the inflection points lies close to the transition range between the first characteristic curve range and the third characteristic curve range or between the second characteristic curve range and the third characteristic curve range in the first characteristic curve range or in the second characteristic curve range, and the other inflection point lies in the third characteristic curve range.

Due to the approach according to the invention, it is possible to flatten characteristic curve ranges having high gradients with little outlay. Since a higher resolution is achieved due to the flattening of the characteristic curve ranges, the influences interfering in the actuation of a valve device have a lesser effect on the actuation of a valve device. This brings about an increase in the accuracy of an actuation of a valve device.

In an advantageous variant of the method according to the invention, the further output values determined for the particular target values are mean values which are determined with little outlay and which are ascertained on the basis of the particular output values determined at the inflection points.

If, during an actuation of the valve device close to the transition range between the first characteristic curve range and the third characteristic curve range or close to the transition range between the second characteristic curve range and the third characteristic curve range, the amplitude of the dither corresponds, at most, to one-half the target value range of the characteristic curve range whose target value range is less than the target value range of the particular other adjoining characteristic curve range, it is ensured that adaptations, which are carried out for the different characteristic curve ranges and increase the accuracy of the actuation of the valve device, do not influence one another.

In a variant of the method according to the invention, which is easily carried out and implemented with little outlay, a harmonic and nearly mean-value-free square wave is impressed upon the valve device via the dither.

If the valve device comprises an electro-hydraulic pressure regulator actuating a valve, and if the target value corresponds to an actuating current of the pressure regulator in each case, while the output value corresponds to an operating condition of the valve in each case, hysteresis influences in the area of an electromagnetic circuit as well as contamination influences and static- and kinetic-friction effects, which adversely affect a desirably precise actuation of the valve, are reducible in an easy way and an actuation of a valve is carried out with a desirably high level of accuracy.

If the valve is a cooling oil distributor valve, in the area of which an applied hydraulic fluid flow is conducted further, with defined degrees of distribution, as a function of the actuating current of the associated pressure regulator in the direction of various areas downstream from the cooling oil distributor valve, wherein the degrees of distribution correspond to defined operating conditions of the cooling oil valve and, therefore, to defined output values, a cooling oil distribution is implemented with a desirably high level of accuracy.

If the valve corresponds to a valve provided for regulating, e.g., via closed-loop control, a variable displacement pump, in the area of which a volumetric output flow of the variable displacement pump is adjustable as a function of the actuating current of an associated pressure regulator, the volumetric output flow is regulated with a desirably high level of accuracy.

The features described in the following exemplary embodiment of the subject matter of the invention are suitable for refining the subject matter of the invention by themselves or in any combination with each other.

BRIEF DESCRIPTION OF THE DRAWINGS

Further advantages and advantageous embodiments of the subject matter of the invention result from the exemplary embodiment, which is described in the following with reference to the drawings.

In the drawings, the following is shown.

DETAILED DESCRIPTION

Figure 1:
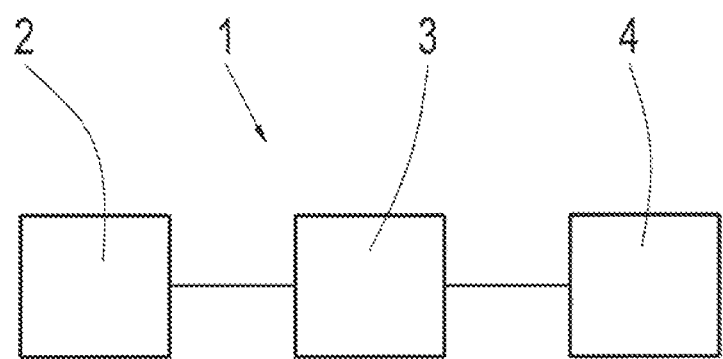
FIG. 1 shows a highly schematic view of a vehicle drive train comprising a drive machine, a driven end, and a transmission arranged between the drive machine and the driven end in the power path of the vehicle drive train.

Reference will now be made to embodiments of the invention, one or more examples of which are shown in the drawings. Each embodiment is provided by way of explanation of the invention, and not as a limitation of the invention. For example, features illustrated or described as part of one embodiment can be combined with another embodiment to yield still another embodiment. It is intended that the present invention include these and other modifications and variations to the embodiments described herein.

FIG. 1 shows a schematic representation of a vehicle drive train 1 comprising a drive machine 2, a transmission 3, provided as a dual clutch transmission, and a driven end 4, wherein the transmission 3 is operatively connected on the input side to the drive machine 2 and on the output side to the driven end 4. The transmission 3 includes an electro-hydraulic transmission control system which comprises a pressure medium source provided as a variable displacement hydraulic pump in this case. The variable displacement hydraulic pump is, in this case, a vane pump which is, e.g., controllable by way of a closed-loop system, with the aid of which a variable displacement is made available. The displacement of the hydraulic pump is adjustable with the aid of a valve device. Alternatively, it is also possible to provide the hydraulic pump as a fixed displacement pump, wherein its displacement is then variable by way of the input speed.

In addition to the valve device, the electro-hydraulic transmission control system also includes a so-called system pressure valve, in the area of which a system pressure is adjustable in a pressure circuit of the electro-hydraulic transmission control system provided as a primary pressure circuit. The primary pressure circuit is supplied with hydraulic fluid, which is made available by the hydraulic pump, by way of the system pressure valve with higher priority than a secondary pressure circuit which is also arranged downstream from the system pressure valve. Various consumers of the transmission 3 are supplied with hydraulic fluid both via the primary pressure circuit and via the secondary pressure circuit, wherein actuating pressure is applied, via the primary pressure circuit, inter alia, to shift elements of a dual clutch system of the transmission 3, while a cooling and lube oil system of the transmission 3 is supplied via the secondary pressure circuit of the electro-hydraulic transmission control system.

In this case, the hydraulic pump is driven directly by the drive machine 2 via an input shaft of the transmission 3, whereby the input speed of the hydraulic pump is essentially equal to the rotational speed of the drive machine 2. Depending on the particular application at hand, it is also possible that a transmission having a defined ratio is provided between the transmission input shaft and the hydraulic pump, via which the rotational speed of the drive machine 2 is transformed to a higher rotational speed level or a lower rotational speed level.

A pilot-controllable cooling valve of the secondary pressure circuit is provided downstream from the system pressure valve, via which the system pressure valve is brought into an operative connection with areas of the transmission 3 in order to supply these areas with hydraulic fluid. Distribution factors of the hydraulic fluid present in the area of the cooling valve of the system pressure valve in the direction of the areas of the transmission 3 vary, at least in some areas, across the operating range of the cooling valve.

In order to increase the achievable accuracy for actuating the cooling valve and, consequently, to be able to largely suppress the described interfering effects, such as static friction and kinetic friction as well as temporary particle contamination, the profile v_kk or the characteristic curve of the cooling valve is manipulated to the extent described in greater detail in the following.

Since characteristic curves include base points or end values, due to the principle thereof, it is possible, in particular, when characteristic curve ranges having high gradients are followed by a plateau, in which the output value no longer changes as a result of the input value, to manipulate a characteristic curve in precisely these boundary regions by suitably actuating the associated device. It is also possible to improve an actuation accuracy, with the aid of the manipulation described in the following, of characteristic curves provided without a plateau when characteristic curve ranges, the gradients of which substantially differ from one another, adjoin one another.

Figure 2:
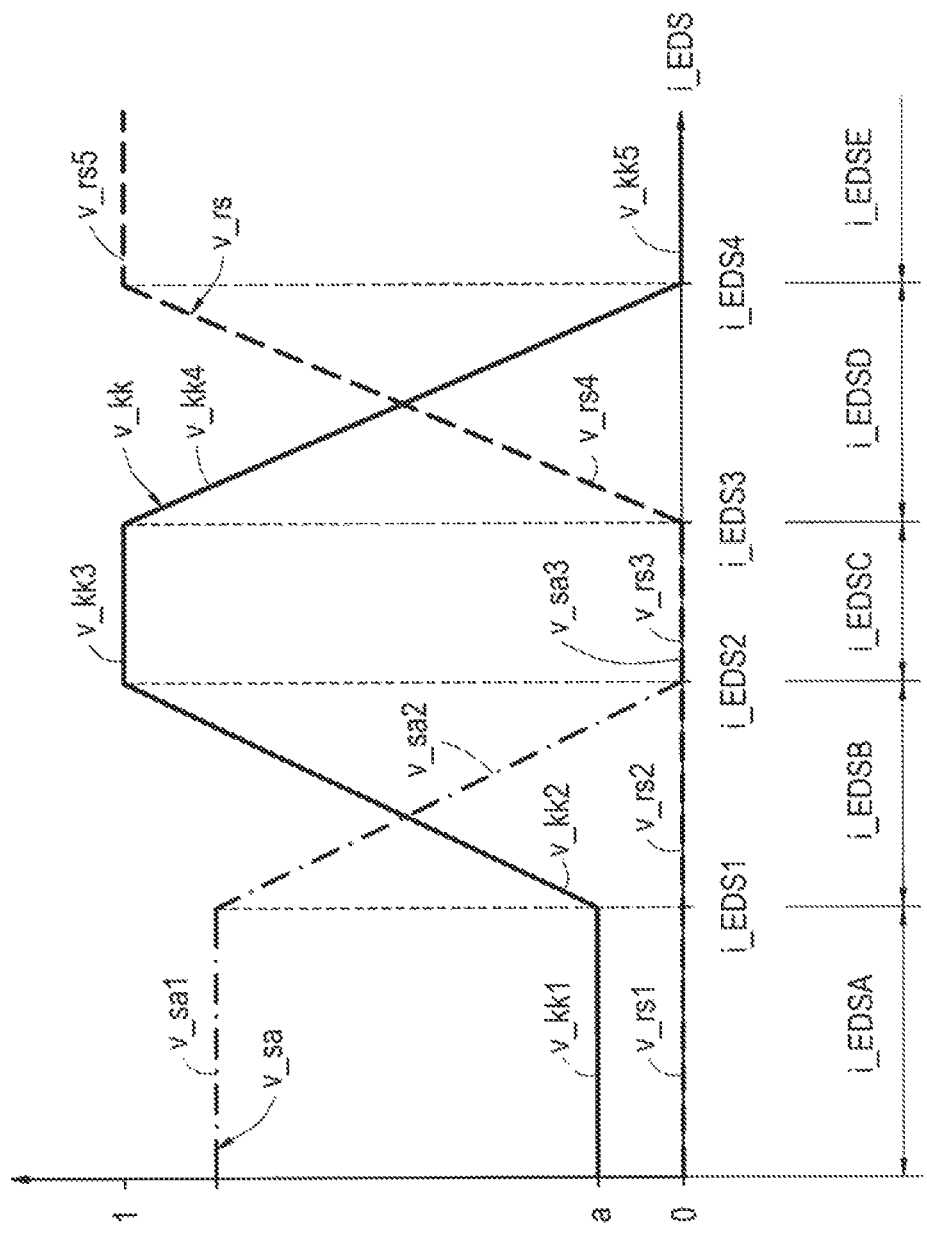
FIG. 2 shows multiple profiles of distribution factors of a hydraulic fluid volume inflow of a cooling valve of the transmission according to FIG. 1 with respect to an actuating current of an electro-hydraulic actuator associated with the cooling valve.

During the manipulation of the profile v_kk shown in FIG. 2 intended for improving the actuation accuracy of the cooling valve, the cooling valve is actuated with a slow dither, for example, a harmonic square wave, which is superimposed on the target value, i.e., the actuating current i_EDS. The frequency of the dither is so slow that the cooling valve and, if necessary, the assembly consisting of the electro-hydraulic pressure regulator and the subsequent slide of the cooling valve can follow the actuation appropriately defined by the characteristic curve v_kk. This is possible whenever the output parameter of the cooling valve, for example, the cooling oil, the volumetric output flow, and the like, does not directly influence the driving impression.

The amplitude of the dither is so high in this case that, during an actuation close to the transition i_EDS1 between the first characteristic curve range v_kk1 and the first transition range v_kk2, between the first transition range v_kk2 and the third characteristic curve range v_kk3, between the third characteristic curve range v_kk3 and the second transition range v_kk4, or between the second transition range v_kk4 and the fifth characteristic curve range v_kk5, the amplitude allows the actuation to extend into the adjoining plateau v_kk1, v_kk3, or v_kk5, respectively, in order to achieve a desirable, accuracy-increasing effect.

This occurs due to the fact that the actuation, which is otherwise nearly free of mean values due to a harmonic oscillation, no longer remains free of mean values precisely at the boundary points i_EDS1, i_EDS2, i_EDS3, and i_EDS4 of the characteristic curve v_kk, assuming a sufficient linearity of the characteristic curve v_kk within the order of magnitude of twice the amplitude of the dither.

As a result of this approach, the boundary points i_EDS1, i_EDS2, i_EDS3, and i_EDS4 of the characteristic curve v_kk representing, inter alia, base points or end points, shift with respect to the actuation of the actual target value i_EDS. On the one hand, the output value, i.e., the distribution factor v_kk of the cooling valve, adjusted, on average, over one dither period, by the half wave of the dither plunging into the particular adjoining plateau v_kk1, v_kk3, or v_kk5, is changed such that the value of the plateau v_kk1, v_kk3, or v_kk5 already sets in. On the other hand, a plunge of the half wave of the dither into the transition range v_kk2 or v_kk4 is achieved upon the actuation of target values i_EDS in the plateau range v_kk1, v_kk3, or v_kk5.

If, for example, the target value is set as precisely the transition from the third characteristic curve range v_kk3 into the fourth characteristic curve range v_kk4 of the characteristic curve v_kk and, therefore, the current value i_EDS3, a determined output value or distribution factor of the cooling valve without the applied dither, corresponds to the value one. If the dither is superimposed on the cooling valve, the one half wave of the dither actuates the cooling valve completely in the third characteristic curve range v_kk3 and, therefore, continuously yields the output value or the distribution factor 1. The other half wave of the dither actuates the cooling valve within the fourth characteristic curve range v_kk4 of the characteristic curve v_kk and continuously yields output values x less than 1. Averaging the values yields the mathematical expression (1+x)/2. Since x is less than 1, it necessarily follows that the mean output value of the cooling valve is less than 1. This effect continues up to the target values i_EDS until the half wave of the dither no longer extends into the fourth characteristic curve range v_kk4 of the characteristic curve v_kk.

Figure 3:
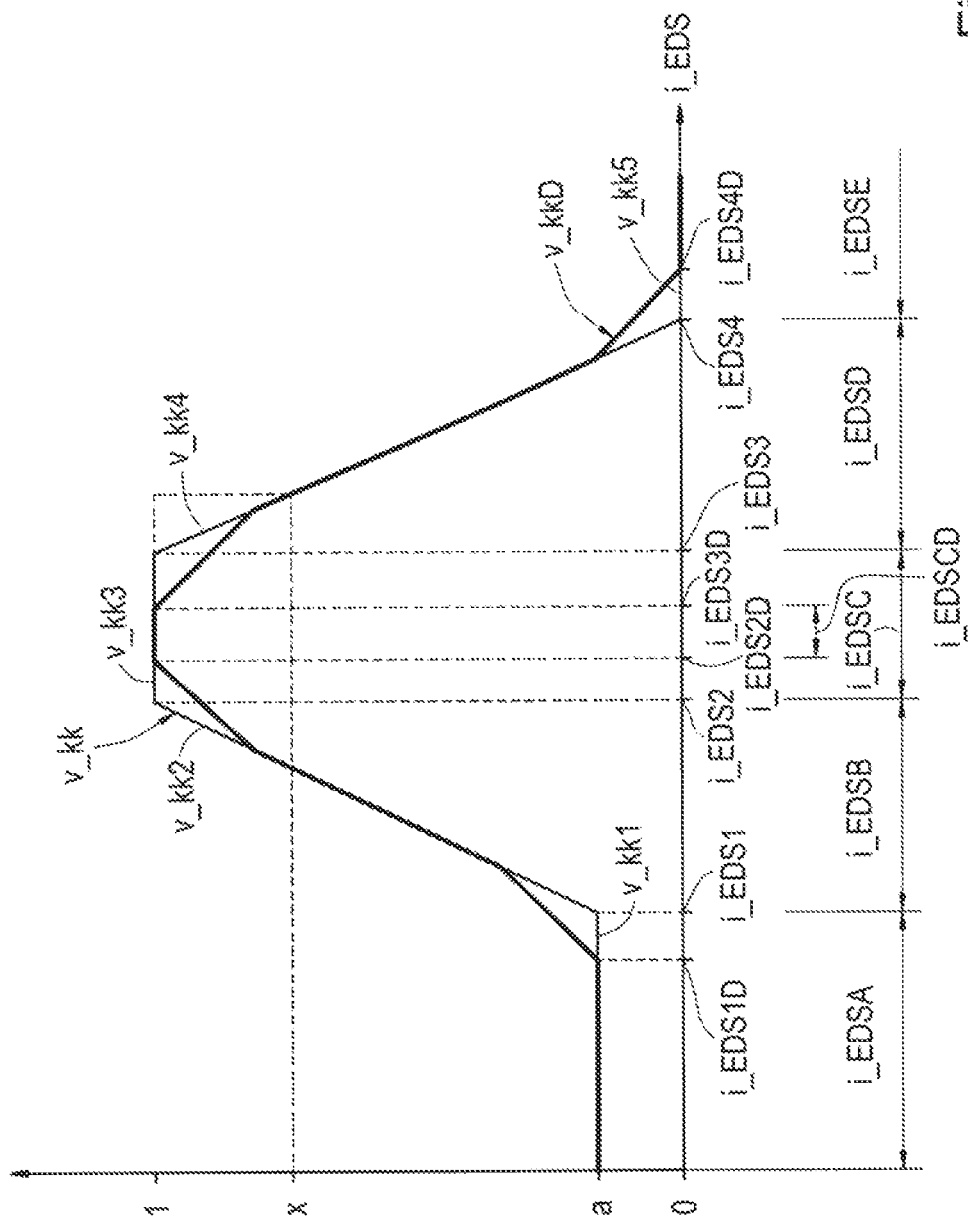
FIG. 3 shows a comparison of two profiles, wherein the first profile corresponds to a profile shown in FIG. 2, where the second profile is the first profile which has been adapted to the extent according to the invention and with the aid of which an actuating accuracy of a cooling valve is improved.

Therefore, it is achievable, in this way, that the base points or end values i_EDS1 and i_EDS4 for the target value actuation, which are critical for the actuation, shift outwardly and, for example, the distribution factor of the cooling valve therefore increases with a smaller gradient starting already at an actuating current value i_EDS1D above the level a, following the adapted characteristic curve v_kkD represented in FIG. 3. The characteristic curve v_kkD corresponds to the characteristic curve which has been adapted by way of the application of the dither and the above-described determination of new output values and which is based on the characteristic curve v_kk determined on the test bench.

The further limiting values i_EDS2 and i_EDS3 of the characteristic curve v_kk shift into the plateau v_kk3 of the characteristic curve v_kk due to the application of the dither and the additionally carried out adaptation of the characteristic curve v_kk, whereby the width of the plateau v_kk3D of the adapted characteristic curve v_kkD defined by the shifted limiting values i_EDS2D and i_EDS3D is smaller than the width of the plateau v_kk3 of the characteristic curve v_kk.

Due to the manipulation of the characteristic curve v_kk, the slope of the characteristic curve v_kk is reduced to the desired extent, at least in some areas, in the transition ranges v_kk2 and v_kk4 between the plateaus v_kk1, v_kk3, and v_kk5. The change of the characteristic curve v_kk achieved due to this effect is appropriately taken into account during the actuation of the target value i_EDS, and the achievable accuracy is increased. This is extremely significant, in particular, with respect to clutch cooling, since the drag torques of this actuator are strongly defined by the cooling oil flow. An insufficient cooling oil flow results in thermal damage of the disks, while an excessive cooling oil flow requires considerably greater synchronization forces during gear selection, whereby, consequently, higher wear values of the affected components are brought about.

At high amplitudes of the dither and during an adaptation of the characteristic curve v_kk in the third operating range i_EDSC, i.e., in the area of the middle plateau v_kk3 of the characteristic curve v_kk, the amplitude is either to be limited at most, during the above-described actuation of the cooling valve, to one-half the target value range i_EDSC of the third operating range of the characteristic curve v_kk or the dither is to be completely deactivated there, in order to avoid erroneous actuations.

Since the valve slide of the cooling valve constantly moves due to the superimposed dither and the resultant actuation, the valve slide exhibits desirable, reproducible dynamics, provided the structural configuration is suitable. This is explained, in physical terms, by a clean floating of the slide in its bore, whereby, for example, lower wear values also result over the service life of the cooling valve. The continuous movement also induces a permanent rinsing of the associated valve gaps, whereby a better heat flux in the area of the wet surfaces is also achieved. Moreover, local air deposits are also effectively rinsed out as a result.

Modifications and variations can be made to the embodiments illustrated or described herein without departing from the scope and spirit of the invention as set forth in the appended claims.

REFERENCE CHARACTERS 1 vehicle drive train
2 drive machine
3 transmission
4 driven end
a distribution factor
i_EDS actuating current
i_EDS1 to i_EDS4 current value, limiting value
EDS1D to i_EDS4D manipulated current value
i_EDS1 to i_EDS4 discrete value of the actuating current
i_EDSA to i_EDSE target value range, operating range
v_kk profile of the distribution factor in the direction of the clutch cooling
v_kk1 to v_kk5 characteristic curve range
v_kkD manipulated profile of the distribution factor in the direction of the clutch cooling
v_kk3D characteristic curve range
v_rs profile of the distribution factor in the direction of the gear set cooling
v_rs1 to v_rs5 characteristic curve range
v_sa profile of the distribution factor in the direction of the suction loading
v_sa1 to v_sa5 characteristic curve range
x distribution factor

The invention claimed is:

1. A method for actuating a valve device as a function of a characteristic curve (v_kk, v_kkD), a target value (i_EDS) corresponding to an actuating parameter of the valve device is determined via the characteristic curve (v_kk, v_kkD), the target value correlating with an output value of the characteristic curve (v_kk, v_kkD) corresponding to a demanded operating condition of the valve device, the characteristic curve (v_kk, v_kkD) encompassing at least a first characteristic curve range (v_kk1 or v_kk3), a second characteristic curve range (v_kk3 or v_kk5), and a third characteristic curve range (v_kk2 or v_kk4), the third characteristic curve range (v_kk2 or v_kk4) being arranged between the first and second characteristic curve ranges (v_kk1 or v_kk3, v_kk3 or v_kk5), a gradient of third characteristic curve range (v_kk2 or v_kk4) being greater than gradients of the first and second characteristic curve ranges (v_kk1 or v_kk3, v_kk3 or v_kk5), the method comprising:

actuating the valve device with a dither superimposed on the target value (i_EDS) with such a frequency that the operating condition of the valve device follows, in a defined way, the actuation corresponding to the characteristic curve (v_kk);

determining, with the characteristic curve (v_kk), the output values ("1", x) which correlate with the target values (i_EDS) at inflection points of a harmonic oscillation impressed upon the valve device with the dither;

determining further output values as a function of the output values ("1", x); and actuating the valve device as a function of the further output values, wherein the amplitude of the dither is predefined such that one of the inflection points lies proximate to a transition (i_EDS1 or i_EDS2) between the first and third characteristic curve ranges (v_kk1 or v_kk3, v_kk2) or a transition (i_EDS3 or i_EDS4) between the second and third characteristic curve ranges (v_kk3 or v_kk5, v_kk4) in the first or second characteristic curve range (v_kk1 or v_kk3, v_kk3 or v_kk5), and another inflection point lies in the third characteristic curve range (v_kk2 or v_kk4).

2. The method of claim 1, wherein the further output values ((1+x)/2)) determined for the target values (i_EDS) are mean values determined as a function of the output values ("1", x) determined at the inflection points.

3. The method of claim 1, wherein, during an actuation of the valve device proximate to the transition (i_EDS2) between the first and third characteristic curve ranges (v_kk3, v_kk2) or proximate to the transition (i_EDS3) between the second and third characteristic curve ranges (v_kk3, v_kk4), the amplitude of the dither corresponds, at most, to one-half a target value range of the characteristic curve range (v_kk3) whose target value range is less than a target value range of the other adjoining characteristic curve range (v_kk2 or v_kk4).

4. The method of claim 1, wherein a harmonic and nearly mean-value-free square wave is impressed upon the valve device via the dither.

5. The method of claim 1, wherein the valve device comprises an electro-hydraulic pressure regulator actuating a valve, and the target value (i_EDS) corresponds to a respective actuating current of the pressure regulator, while the output value corresponds to a respective operating condition (v_kk) of the valve.

6. The method of claim 5, wherein the valve is a cooling oil distributor valve, in the area of which an applied hydraulic fluid flow is conducted, with defined degrees of distribution (v_kk, v_sa, v_rs), as a function of the actuating current (i_EDS) of the pressure regulator towards areas downstream of the cooling oil distributor valve, and the degrees of distribution (v_kk, v_sa, v_rs) correspond to defined operating conditions of the cooling oil valve and, therefore, to defined output values.

7. The method of claim 5, wherein the valve is provided for controlling a variable displacement pump, a volumetric output flow of the variable displacement pump being adjustable as a function of the actuating current (i_EDS) of the pressure regulator.

* * * * *